(12) United States Patent
Sedlak et al.

(10) Patent No.: US 7,574,543 B2
(45) Date of Patent: Aug. 11, 2009

(54) METHOD FOR OPERATING A PROCESSOR BUS

(75) Inventors: Holger Sedlak, Egmating (DE); Oliver Kniffler, München (DE); Wolfgang Gärtner, München (DE)

(73) Assignee: Infineon Technologies AG (DE)

( * ) Notice: Subject to any disclaimer, the term of this patent is extended or adjusted under 35 U.S.C. 154(b) by 162 days.

(21) Appl. No.: 10/112,290

(22) Filed: Mar. 28, 2002

(65) Prior Publication Data

US 2002/0156956 A1    Oct. 24, 2002

Related U.S. Application Data

(63) Continuation of application No. PCT/DE00/03273, filed on Sep. 20, 2000.

(30) Foreign Application Priority Data

Sep. 29, 1999    (DE) ................... 199 46 716

(51) Int. Cl.
*G06F 13/00* (2006.01)
(52) U.S. Cl. ............... 710/104; 710/240; 710/313; 710/117
(58) Field of Classification Search ............ 710/104, 710/240–244, 107, 45, 117, 305–317
See application file for complete search history.

(56) References Cited

U.S. PATENT DOCUMENTS

| | | | |
|---|---|---|---|
| 4,764,896 A * | 8/1988 | Freimark et al. ............. 710/3 |
| 5,682,512 A * | 10/1997 | Tetrick .................. 711/202 |
| 5,699,529 A * | 12/1997 | Powell et al. ............. 710/53 |
| 5,751,996 A * | 5/1998 | Glew et al. .............. 711/145 |
| 5,796,968 A * | 8/1998 | Takamiya ................ 710/113 |
| 5,850,541 A * | 12/1998 | Sugimoto ................ 713/601 |
| 5,884,052 A * | 3/1999 | Chambers et al. .......... 710/107 |
| 5,943,483 A * | 8/1999 | Solomon ................. 710/107 |
| 5,948,089 A * | 9/1999 | Wingard et al. ........... 710/107 |
| 5,974,571 A * | 10/1999 | Riesenman et al. .......... 714/47 |
| 6,148,359 A * | 11/2000 | Elkhoury et al. ........... 710/311 |
| 6,192,036 B1 * | 2/2001 | Buhler et al. ............. 370/252 |
| 6,212,590 B1 * | 4/2001 | Melo et al. .............. 710/119 |
| 6,260,091 B1 * | 7/2001 | Jayakumar et al. .......... 710/113 |
| 6,289,406 B1 * | 9/2001 | Chambers et al. .......... 710/107 |

(Continued)

FOREIGN PATENT DOCUMENTS

DE    36 42 324 C2    6/1987

(Continued)

OTHER PUBLICATIONS 1014-1987 IEEE standard for A Versatile Backplane Bus: VMEbus 1987.*

(Continued)

*Primary Examiner*—Clifford H Knoll
*Assistant Examiner*—Kim T Huynh
(74) *Attorney, Agent, or Firm*—Dickstein, Shapiro, LLP.

(57) ABSTRACT

A method of operating a processor bus, with which a central unit (processor) makes accesses to various peripheral units, is described. The processor bus has the ability to change the order of the accesses as a function of the operating state of the peripheral units, and the peripheral units can either reject or delay the access.

5 Claims, 1 Drawing Sheet

U.S. PATENT DOCUMENTS

| | | | |
|---|---|---|---|
| 6,311,244 B1 * | 10/2001 | Sheafor et al. | 710/107 |
| 6,385,686 B1 * | 5/2002 | Brown | 710/313 |
| 6,397,277 B1 * | 5/2002 | Kato et al. | 710/104 |
| 6,442,514 B1 * | 8/2002 | Le | 703/21 |
| 6,480,923 B1 * | 11/2002 | Moertl et al. | 710/305 |
| 6,510,532 B1 * | 1/2003 | Pelly et al. | 714/43 |
| 6,687,240 B1 * | 2/2004 | Moertl et al. | 370/351 |

FOREIGN PATENT DOCUMENTS

| | | |
|---|---|---|
| EP | 0 588 472 B1 | 3/1994 |
| EP | 0 665 501 A1 | 8/1995 |
| JP | 05 334 239 | 12/1993 |
| JP | 5-334239 | 12/1993 |
| JP | 06 236 347 | 8/1994 |
| JP | 08 272 737 | 10/1996 |
| JP | 11-051697 * | 2/1999 |

OTHER PUBLICATIONS

IEEE, p. 211, The design of easily scalable bus arbiters with different dynamic priority asssignment schemes.*

* cited by examiner

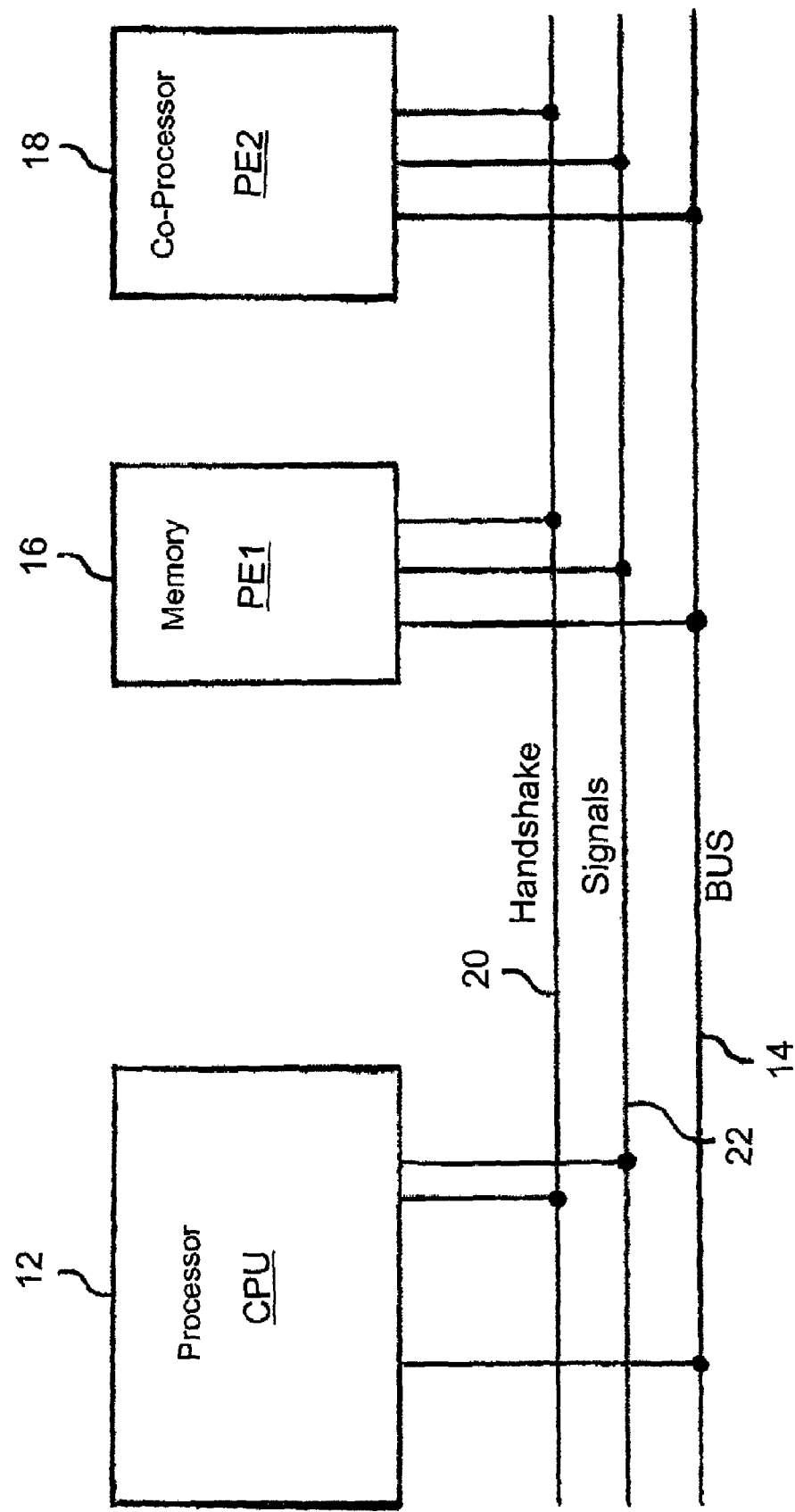

METHOD FOR OPERATING A PROCESSOR BUS

CROSS-REFERENCE TO RELATED APPLICATION

This application is a continuation of copending International Application No. PCT/DE00/03273, filed Sep. 20, 2000, which designated the United States.

BACKGROUND OF THE INVENTION

Field of the Invention

The present invention relates to a method of operating a processor bus, with which a central unit (processor) can make access to various peripheral units.

In the processor systems according to the prior art, it is normal for the processor itself, that is to say the central computing unit (CPU), to be connected to the peripheral devices (peripheral units) via a bus, as it is known, that is to say a common data line. The peripheral devices can be memories of every type, coprocessors, data input and output devices. The speed with which the peripheral devices can react to data requests from the central unit of course depends to a quite different extent on the type of the respective devices.

According to the prior art, an access by the processor to a peripheral device via the bus blocks the processor until the access is completed. As a result, the processor operating time, that is to say the computing power, is unnecessarily lost.

SUMMARY OF THE INVENTION

It is accordingly an object of the invention to provide a method for operating a processor bus that overcomes the above-mentioned disadvantages of the prior art devices of this general type, in which access time losses are reduced or avoided.

With the foregoing and other objects in view there is provided, in accordance with the invention, a method of operating a processor bus with which a central unit requests accesses to various peripheral units. The method includes changing an ordering of the accesses in dependence on an operating state of the peripheral units.

According to the invention, in the method of operating the processor bus, with which a central unit (processor) makes access to various peripheral units, the object is achieved by its being possible for the order of the accesses to be changed as a function of the operating state of the peripheral units. The peripheral units in this case preferably signal their operating state to the central unit via the processor bus. The simplest method sequence results when the operating state message from a peripheral unit follows an access attempt by the central unit to the peripheral unit.

In this case, it is particularly preferred for the central unit to repeat the access attempts in each case at specific time intervals, until the peripheral unit is ready.

The central unit can preferably use the bus for other data traffic in the time periods between the access attempts.

In addition, it may be advantageous if the peripheral units have various feedback messages available, specifically rejection or delay of the access. In the case of the delay, the access attempt can then be repeated, in the case of a rejection the processor can process other tasks in between.

The present invention is based on the fact that the access of the central unit, for example the processor, via a processor bus to various peripheral units, such as memories, coprocessors, data input and output devices, is prioritized or delayed by signaling the state of the peripheral units. In this case, the various peripheral units can either reject or delay accesses.

The central unit, that is to say the processor, can prioritize and/or delay its accesses by this information and can therefore achieve better bus utilization and overall performance, since waiting times for the peripheral units are minimized.

Other features which are considered as characteristic for the invention are set forth in the appended claims.

Although the invention is illustrated and described herein as embodied in a method for operating a processor bus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a block diagram of a processor bus and related components according to the invention.

DESCRIPTION OF THE PREFERRED EMBODIMENTS

Referring now to the single FIGURE of the drawing, there is shown a processor bus 14, 20, 22 and related components that will be used to explain two exemplary embodiments of the invention.

A central processing unit (CPU) 12 is operated with peripheral units 16, 18, such as memories 16. Some of the peripheral units 16, 18 may cause delays during an access process, since their access time does not permit access to be made to them at the highest bus speed. In such a case, during an access that it cannot satisfy at a bus clock speed, according to the invention the memory 16 sets a signal, so that the access is repeated until the memory 16, has provided the data. In this case, it is therefore not necessary to reduce the operating speed of the CPU 12 to the speed of the memory 16, or to have the CPU 12 wait for the memory 16. Such an adaptation of the CPU 12 to the speed of the memory 16, required in accordance with the prior art, is avoided by the invention. The peripheral devices 16, 18 are connected to the CPU 12 by the bus or signals lines 14, 20 and 22.

Alternatively, the CPU 12 can be operated with a coprocessor 18, for example with a mathematical or a graphic coprocessor 18, which needs some computing time and is therefore not always ready to receive information. If the coprocessor 18 signals that it is not ready to receive (the access is therefore rejected), then the CPU 12 can bring forward other accesses to the processor bus 14, 20, 22 and delay the access.

We claim:

1. A method of operating a processor bus with which a central processing unit requests access to various peripheral units, the processor bus having bus lines directly connecting electrically the central processing unit to the various peripheral units without any intervening components, which comprises:

setting and sending a signal from a peripheral unit, if the peripheral unit cannot fulfill the access with a predetermined bus speed set so that an operating speed of the central processing unit is maintained during the access, until requested data are available;

analyzing the signal, via the central processing unit, for one of prioritizing and delaying access attempts;

using the processor bus and the central processing unit for other data traffic in time periods between the access attempts; and repeating the access attempts, at periodic intervals, by the central processing unit until the access is granted by the peripheral unit.

2. The method according to claim 1, further comprising reporting an operating state of the peripheral unit to the central processing unit over the processor bus.

3. The method according to claim 2, further comprising reporting the operating state of the peripheral unit after an access attempt by the central processing unit to the peripheral unit.

4. The method according to claim 3, further comprising repeating the access attempt by the central unit in each case at specific intervals, until the respective peripheral unit is ready.

5. The method according to claim 1, wherein the peripheral unit can one of reject and delay a respective access.

* * * * *